UNITED STATES PATENT OFFICE.

JOHN CUNINGHAME MONTGOMERIE, OF DALMORE, STAIR, SCOTLAND.

PROCESS OF EXTRACTING GOLD OR SILVER FROM ORES.

SPECIFICATION forming part of Letters Patent No. 524,601, dated August 14, 1894.

Application filed October 25, 1892. Serial No. 449,975. (No specimens.) Patented in England July 8, 1892, No. 12,641; in New Zealand October 22, 1892, No. 5,487; in Transvaal December 21, 1892, No. 431; in India April 21, 1893, No. 117; in Cape Colony April 24, 1893, No. 836; in South Australia May 3, 1893, No. 2,474; in New South Wales May 5, 1893, No. 4,392; in Victoria May 10, 1893, No. 10,513; in Tasmania May 13, 1893, No. 1,160; in Canada July 7, 1893, No. 43,524, and in Austria-Hungary August 26, 1893, No. 18,189 and No. 42,062.

*To all whom it may concern:*

Be it known that I, JOHN CUNINGHAME MONTGOMERIE, a subject of the Queen of Great Britain and Ireland, of the Water of Ayr and Tam O'Shanter Hone Works, Dalmore, Stair, in the county of Ayr, Scotland, have invented a certain new and useful Improvement in the Extraction of Gold or Silver from Ores or Compounds Containing the Same, (in respect whereof I have obtained Letters Patent in Austria-Hungary, Reg. No. 18,189 and No. 42,062, dated August 26, 1893; in British India, Reg. No. 117, dated April 21, 1893; in Canada, No. 43,524, dated July 7, 1893; in Cape Colony, fol. No. 836, dated April 24, 1893; in Great Britain, No. 12,641, dated July 8, 1892; in New South Wales, No. 4,392, dated May 5, 1893; in New Zealand, No. 5,487, dated October 22, 1892; in South Australia, No. 2,474, dated May 3, 1893; in Tasmania, No. 1,160, dated May 13, 1893; in Transvaal, No. 431, dated December 21, 1892, and in Victoria, No. 10,513, dated May 10, 1893,) of which the following is a specification.

This invention relates to the treatment of auriferous and argentiferous ores or compounds, for the purpose of separating and collecting the gold and silver contained therein, by means of solvent agents—as, for example, cyanide of potassium.

According to a method commonly employed in the recovery of gold and silver by means of cyanide of potassium, the ore or other material, having been reduced to a finely-triturated state, is placed, along with the solvent, in a barrel or other vessel and is there subjected to agitation. After the lapse of a few hours, the contents of the barrel are removed to a filter, where the liquid portion of the charge (containing the precious metals in solution) is separated from the ore. The latter is further washed for the removal of any gold or silver remaining, in solution, therewith. The cyanide solution of gold and silver, as also the wash-water, is then treated for the recovery of the precious metals by precipitation in a zinc filter or percolator. When a cyanide solvent is employed as hereinbefore described, a certain portion thereof is taken up by base metals and other impurities invariably present in greater or less proportions in the ore. The solvent is also contaminated by the zinc dissolved while the mixture of ore and solvent is under treatment in the zinc percolator; both of these causes resulting in a considerable waste of the cyanide, and in its contamination with deleterious matter.

My improvement in the process of extraction by means of the kind hereinbefore referred to consists in adding sodium oxide (caustic soda), or other suitable oxide of the alkalies, to the cyanide solution before mixing the same with the ore, thereupon agitating or otherwise treating the resultant mass for the time requisite for enabling the gold and silver to be dissolved by such a solution, then discharging the same into a filter and drawing off the original quantity of water employed; the same being highly charged with the unconsumed cyanide and sodium oxide, and with the precious metals in solution. In carrying out this stage of the process, a sufficient quantity of water is added to the surface of the ore in the filter so soon as it becomes dry, the added water displacing the liquid remaining in the ore and permitting the latter to be discharged. The liquid obtained is then tested for cyanide of potassium and sodium oxide, and the deficiency supplied or the solution fortified by the addition of the necessary quantity of these agents so as to restore the solvent solution to its original character and strength. This solution is now applied to a fresh charge of ore and the same operation is repeated with successive charges till it is found necessary to discharge the solution, with a view to precipitating the gold and silver in the usual manner. Experiment alone can determine the quantity of solvent and of sodium oxide appropriate and the period of time requisite to insure the greatest extraction of the precious metals, and the least consumption of the solvent, as these will vary according to the nature of the ore operated upon. The tailings are then further washed to remove the last trace of gold and silver remaining in solution, and the resultant wash-water is treated in the usual way for the recovery of the precious metals contained therein. By this mode of procedure, considerable economy is effected, both in the quantity of cyanide or other solvent used, and in the cost of working; the quantity of liquid subjected to treatment for the recovery of the gold and silver by precipitation being at the same time greatly reduced.

I am aware that it is not an uncommon practice to neutralize any acid which may be present in the ore by adding carbonate of potash or carbonate of soda thereto prior to the application of the cyanide solution, but such neutralization of the ore with an alkali does not by any means accomplish the object of my invention, or effect the great economy in the cyanide which I am able to obtain by adding a caustic alkali, such as sodium oxide to the cyanide solution.

What I claim as my invention, and desire to secure by Letters Patent, is—

The improved process for extracting gold and silver from ores or compounds containing the same, which consists in treating a charge of ore with a cyanide and alkaline solvent, then separating the solution from this charge of ore or compound, then fortifying the said solution as described, applying the fortified but unsaturated solution containing the precious metals dissolved from the previous charge to a subsequent charge of fresh ore or compound, and then subsequently applying said solution successively fortified to successive charges of ore or compound and ultimately when the solution is approximately saturated treating it in any approved way for the recovery of the precious metals, substantially as described.

JOHN CUNINGHAME MONTGOMERIE.

Witnesses:
W. C. BUCHANAN,
W. M. LOCKHART.